US009256946B2

United States Patent
Chang et al.

(10) Patent No.: US 9,256,946 B2
(45) Date of Patent: Feb. 9, 2016

(54) ACCURACY COMPENSATION METHOD, SYSTEM, AND DEVICE

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Chih-Kuang Chang, New Taipei (TW); Xin-Yuan Wu, Shenzhen (CN); Peng Xie, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/468,344

(22) Filed: Aug. 26, 2014

(65) Prior Publication Data
US 2015/0055852 A1   Feb. 26, 2015

(30) Foreign Application Priority Data

Aug. 26, 2013   (CN) .......................... 2013 1 0374098

(51) Int. Cl.
*G06K 9/00*   (2006.01)
*G06T 7/00*   (2006.01)
*G05B 19/401*   (2006.01)

(52) U.S. Cl.
CPC ............ *G06T 7/0038* (2013.01); *G05B 19/401* (2013.01); *G06T 7/0004* (2013.01); *G06T 7/0085* (2013.01); *G05B 2219/37019* (2013.01); *G05B 2219/49166* (2013.01); *G05B 2219/50058* (2013.01); *G06T 2207/20004* (2013.01); *G06T 2207/20148* (2013.01); *G06T 2207/30136* (2013.01); *G06T 2207/30164* (2013.01)

(58) Field of Classification Search
None
See application file for complete search history.

(56) References Cited

U.S. PATENT DOCUMENTS 5,255,199 A * 10/1993 Barkman et al. .............. 700/175
8,103,376 B2 * 1/2012 Wang et al. .................... 700/195

FOREIGN PATENT DOCUMENTS

EP          064092 A2 *   1/1995   ............. G05B 19/42

* cited by examiner

*Primary Examiner* — Daniel Mariam
(74) *Attorney, Agent, or Firm* — Novak Druce Connolly Bove + Quigg LLP (57) ABSTRACT

A method for applying accuracy compensation to a computer numerically controlled (CNC) machine can compensate control program that controls the CNC machine. The method recognizes an actual outline of the product using an image of product produced by the CNC machine controlled by the control program, and further obtains an ideal outline of the product. The method obtains compensation values by computing coordinate differences between points of the actual outline and points on the ideal outline, and compensates the control program using the compensation values.

20 Claims, 8 Drawing Sheets

ACCURACY COMPENSATION METHOD, SYSTEM, AND DEVICE

CROSS-REFERENCE TO RELATED APPLICATIONS

This application claims priority to Chinese Patent Application No. 201310374098.2 filed on Aug. 26, 2013, in the Chinese Intellectual Property Office, the contents of which are incorporated by reference herein.

FIELD

The subject matter herein generally relates to measurement techniques, and more specifically to a device, a method, and a system of accuracy compensation for a control program and/or a cutting tool of a computer numerically controlled (CNC) machine.

BACKGROUND

A three-axis CNC milling machine can be controlled by control processes to allow a cutting tool of the CNC machine for movement in three directions, X, Y, and Z. By moving the cutting tool, material is removed from a block of material, e.g., metal or plastic, until a desired product is produced.

For achieving high quality products, the control processes and/or a position of the cutting tool on the CNC machine should be accurate.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The word "module," as used hereinafter, refers to logic embodied in hardware or firmware, or to a collection of software instructions, written in a programming language, such as, for example, Java, C, or assembly. One or more software instructions in the modules may be embedded in firmware. It will be appreciated that modules may comprise connected logic units, such as gates and flip-flops, and may comprise programmable units, such as programmable gate arrays or processors. The modules described herein may be implemented as either software and/or hardware modules and may be stored in any type of non-transitory computer-readable storage medium or other computer storage device. The term "comprising," when utilized, means "including, but not necessarily limited to"; it specifically indicates open-ended inclusion or membership in the so-described combination, group, series and the like.

Figure 1:
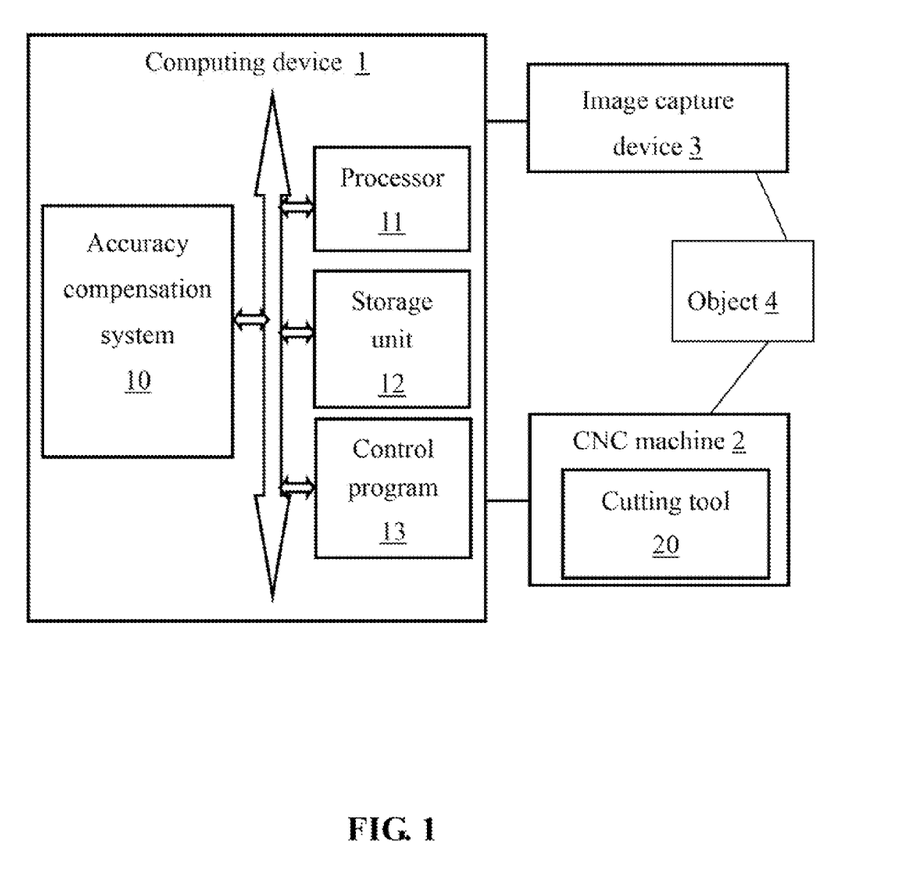
FIG. 1 is a block diagram of one embodiment of a computing device including an accuracy compensation system.

FIG. 1 is a block diagram of one embodiment of a computing device including an accuracy compensation system.

The accuracy compensation system 10 is installed and runs on the computing device 1. The computing device 1 can be a computer, a server, and any other electronic device. The computing device 1 can be connected to a computer numerically controlled (CNC) machine 2 and an image capture device 3.

The computing device 1 includes, but is not limited to, a processor 11, a storage unit 12, and a control program 13. The processor 11 may be a central processing unit (CPU) or microprocessor that executes programs, such as the control program 13. The storage unit 12 can include some types of non-transitory computer-readable storage medium, for example a hard disk drive, a compact disc, a digital video disc, or a tape drive. The control program 13, when executed by the processor 11, can control the CNC machine 2 to cut material away from a block of material (e.g., metal or plastic), by allowing a cutting tool 20 of the CNC machine 2 to move along three directions, X, Y, and Z, to produce products having desired shaped, such as a product 4. In at least one embodiment, the control program 13 can also be stored and installed in a control device which is connected to the computing device 1, or installed in the CNC machine 2.

The image capture device 3 can be a camera, a digital video camera, for example. In at least one embodiment, the image capture device 3 can be a component, such as a charge-couple device (CCD) that can be integrated into the CNC machine 2 or the computing device 1. The image capture device 3 can capture images of the product 4 and/or the cutting tool 20. The images can be transmitted to the computing device 1 when executing the accuracy compensation system 1 to compensate the control program 13 and/or the cutting tool 20.

Figure 2:
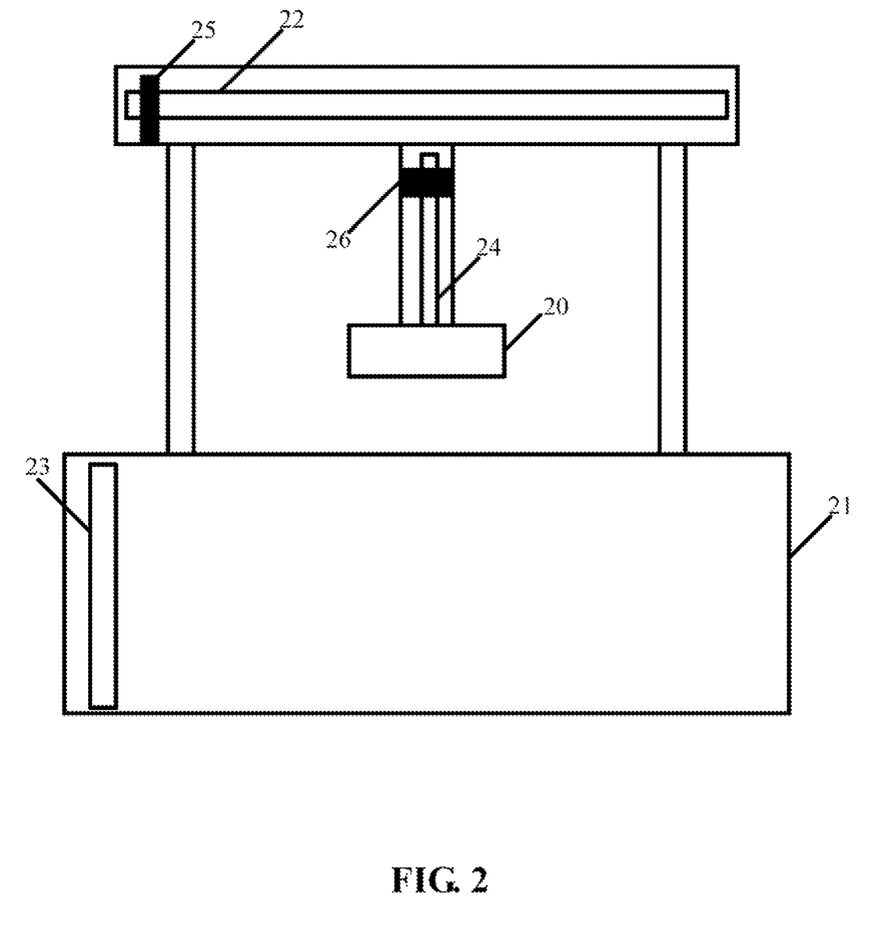
FIG. 2 is a diagrammatic view of a CNC machine.

FIG. 2 is a diagrammatic view of a CNC machine. The CNC machine 2 includes the cutting tool 20, and further includes a working platform 21, a X-axis grating scale 22, a Y-axis grating scale 23, a Z-axis grating scale 24, a X-axis motor 25 and a Z-axis motor 26.

When cutting a material away from a block of material (e.g., metal or plastic), the control program 13 in the computing device 1 controls the cutting tool 20 to move along three axes, X-axis, Y-axis, and Z-axis by actuation of the X-axis motor 25 and the Z-axis motor 26. Products can be produced by cutting the block of material placed on the working platform 21 using the X-axis grating scale 22, the Y-axis grating scale 23, and the Z-axis grating scale 24.

Figure 3:
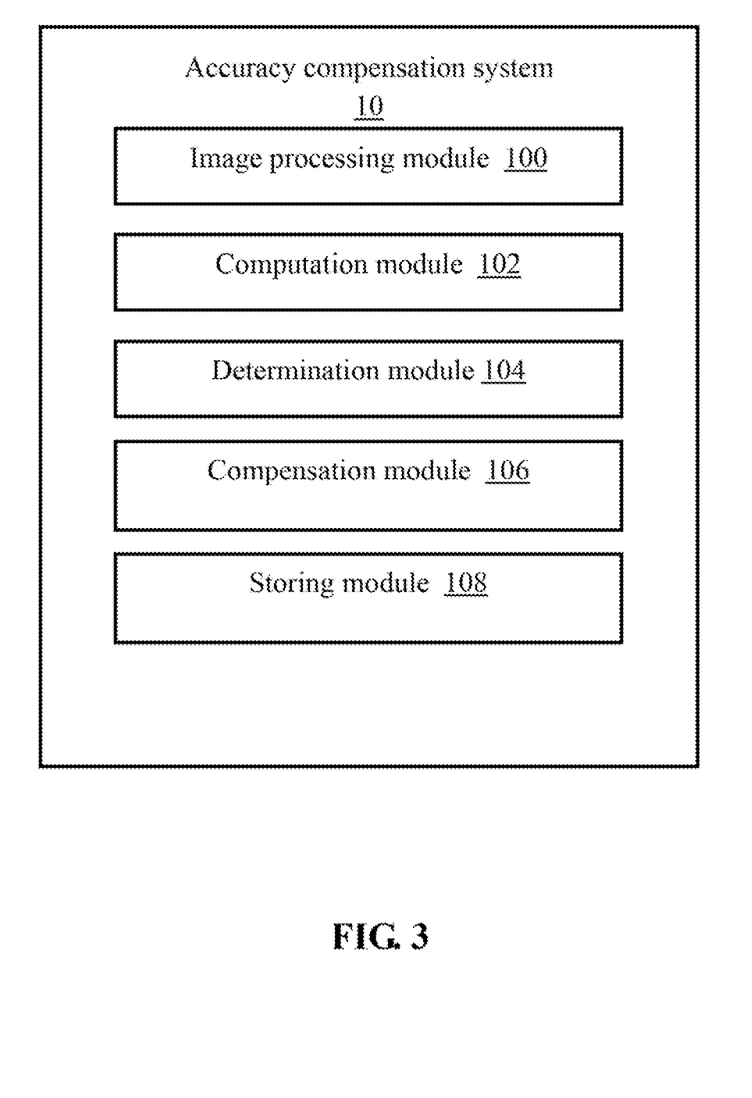
FIG. 3 is a block diagram of one embodiment of function modules of the accuracy compensation system.

FIG. 3 is a block diagram of one embodiment of function modules of the accuracy compensation system. The accuracy compensation system 10 can include a plurality of function modules including an image processing module 100, a computation module 102, a determination module 104, a compensation module 106, and a storing module 108.

The function modules 100, 102, 104, 106, 108 of the accuracy compensation system 10 can include computerized codes that can be stored in the storage unit 12. When being executed by the processor 11, the function modules can perform the functions described below.

The image processing module 100 can obtain an image of the product 4. In one embodiment, the image processing module 100 can send a predetermined command to the image capture device 3, control the image capture device 3 to capture the image of the product 4 according to the predetermined command, and obtain the image of the product 4 from the image capture device 3. In at least one embodiment, the image processing module 100 can obtain the image of the product 4 from the storage unit 12, or a database that is connected to the computing device 1 via a network.

Figure 6:
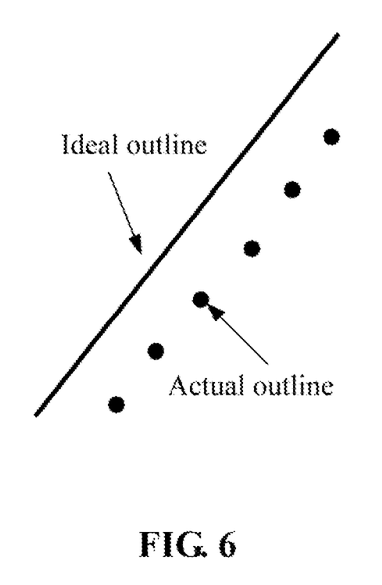
FIG. 6 and FIG. 7 show examples of an actual outline and an ideal outline of a product.

The image processing module 100 further can recognize an actual outline of the product 4 according to the image of the product 4. In one embodiment, the actual outline is composed by points as shown in FIG. 6. The image processing module 100 further can determine coordinates of points of the actual outline. In one embodiment, the image processing module 100 converts the image of the product 4 to a binary image by implementing an adaptive threshold segmentation of pixels of the image, and recognizes the actual outline of the product 4 according to a pixel variation in the binary image. The adaptive threshold segmentation is executed by using a threshold, such as 125, to segment the pixels of the image. When the pixel of the image is less than the threshold, the pixel is changed to a value 0 for example, and when the pixel of the image is more than or equal to the threshold, the pixel is changed to a value 1 for example. In one embodiment, the image processing module 100 determines coordinates of points of the actual outline according to the X-axis grating scale 22, the Y-axis grating scale 23, and the Z-axis grating scale 24.

The computation module 102 can obtain an ideal outline of the product 4 from a CAD model of the product 4. In one embodiment, the ideal outline is composed by a line, such as an example shown in FIG. 6. The CAD model of the product 4 can be pre-stored in the storage unit 12 of the computing device 1. In other embodiments, the CAD model of the product 4 can be obtained from a database (not shown) through a network.

The computation module 102 further can align the actual outline and the ideal outline of the product 4 according to a predetermined formulas. In one embodiment, the formula is $$f(X) = \text{Min} \sqrt{\frac{\sum_{n=1}^{n} \left(\sqrt{(X2-X1)^2 + (Y2-Y1)^2 + (Z2-Z1)^2}\right)^2}{n}}.$$

In the formula, (X2, Y2, Z2) are coordinates of the points of the actual outline, and (X1, Y1, Z1) are coordinates of points on the ideal outline. As shown in FIG. 6, the actual outline and the ideal outline of the product 4 are aligned when a computed f(X) reaches minimum.

Figure 7:
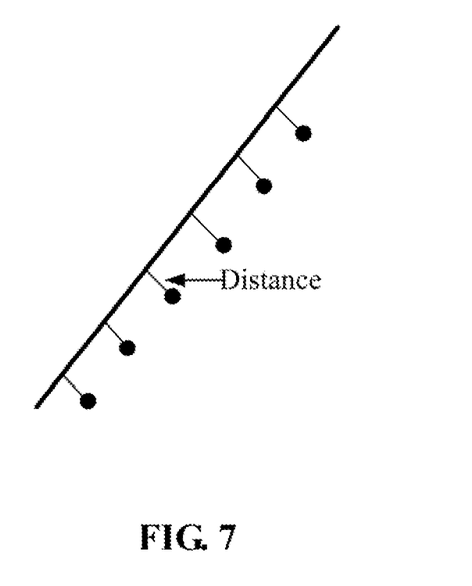

The computation module 102 further can compute minimum distances from each of the points of the actual outline to the ideal outline, such as an example shown in FIG. 7.

The determination module 104 can determine points on the ideal outline, each of which corresponds to one of the points on the actual outline, according to the minimum distances, and obtain coordinates of the points on the ideal outline.

The determination module 104 further can compute coordinate differences between each of the points of the actual outline and the corresponding point on the ideal outline. For example, a point (X, Y, Z) of the actual outline has a minimum distance D to the ideal outline. According to the minimum distance D, the point on the ideal outline corresponding to the point (X, Y, Z) is a point (X', Y', Z'), then the coordinate difference is (X-X', Y-Y', Z-Z'). The coordinate differences are considered to be compensation values of the points on the ideal outline.

The compensation module 106 can obtain the control program 13 that can control the CNC machine 2 to produce the product 4, and obtain a measurement path of the cutting tool 20 of the CNC machine 2 according to the control program 13. As mentioned above, the control program 13 controls the cutting tool 20 to move along three directions, X, Y, and Z to cut the product 4 from a block of material. The movement along three directions, X, Y, and Z is the measurement path of the cutting tool 20.

The compensation module 106 further can determine points on the measurement path corresponding to the points on the ideal outline, and generate a compensated measurement path by compensating the points on the measurement path using the compensation values.

The compensation module 106 further can correct the control program 13 according to the compensated measurement path.

The storing module 108 can store the corrected control program 13 into the storage unit 12, for example. In other embodiment, the storing module 108 further can transmit the corrected control program 13 to another control device that is connected to the computing device 1 or the CNC machine 2.

It may be understood that, the functions described above performed by the function modules 100, 102, 104, 106, 108 can compensate the control program 13. In other embodiment, the function modules 100, 102, 104, 106, 108 also perform function of compensating the cutting tool 20 of the CNC machine 2 as described below.

The image processing module 100 can obtain an image of the cutting tool 20. In one embodiment, the image processing module 100 can send a predetermined command to the image capture device 3 to control the image capture device 3 to capture the image of the cutting tool 20, and obtain the image of the cutting tool 20 from the image capture device 3. In at least one embodiment, the image processing module 100 can obtain the image of the cutting tool 20 from the storage unit 12, or a database that is connected to the computing device 1 via a network.

The image processing module 100 further can convert the image of the cutting tool 20 to a binary image by implementing an adaptive threshold segmentation of pixels of the image of the cutting tool 20.

The image processing module 100 further can recognize actual outline points of the cutting tool 20 according to a pixel variation in the binary image of the cutting tool 20, and determine coordinates of the actual outline points. In one embodiment, the image processing module 100 determines coordinates of the actual outline points using the X-axis grating scale 22, the Y-axis grating scale 23, and the Z-axis grating scale 24 of the CNC machine 2.

The computation module 102 can compute an actual center point of the cutting tool 20 using the coordinates of the actual outline points. In one embodiment, the coordinate (X, Y, Z) of the actual center point is computed according to formulas:

$$X = \frac{\sum_{i=1}^{n} X_i}{n}, Y = \frac{\sum_{i=1}^{n} Y_i}{n}, \text{ and } Z = \frac{\sum_{i=1}^{n} Z_i}{n}.$$

In the formulas, $(X_i, Y_i, Z_i)$ are coordinates of the actual outline points.

The determination module 104 can obtain an ideal center point of the cutting tool 20. The ideal center point of the cutting tool 20 can be obtained from the storage unit 12 or a database which is connected to the computing device 1 via a network. In at least one embodiment, the ideal center point of the cutting tool 20 can be obtained according to coordinates of ideal outline points of the cutting tool 20 according to the formulas above.

The determination module 104 further can compare the coordinates of the ideal center point and the actual center point of the cutting tool 20, and determine a center point compensation value. For example, when the coordinate of the actual center point of the cutting tool 20 is (X, Y, Z), and the coordinate of the ideal center point of the cutting tool 20 is point (X', Y', Z'), the center point compensation value is (X-X', Y-Y', Z-Z').

The storing module 108 can store the center point compensation value of the cutting tool 20 into the storage unit 12, for example. In other embodiment, the storing module 108 further can send the center point compensation value to the CNC machine 2. The CNC machine 2 can adjust a position of the cutting tool 20 according to the center point compensation value.

The function modules 100, 102, 104, 106, 108 can perform function of compensating center point of the cutting tool 20 of the CNC machine 2 as described above. In at least one embodiment, the function modules 100, 102, 104, 106, 108 also can perform function of compensating other attributes of the cutting tool 20, such as center axis of the cutting tool 20, in the same way. For example, the function modules can compute an actual center axis of the cutting tool 20 according to the actual outline points of the cutting tool 20. The function modules further can obtain an ideal center axis of the cutting tool 20, compare the actual center axis and the ideal center axis, and determine the center axis compensation value.

Figure 4A:
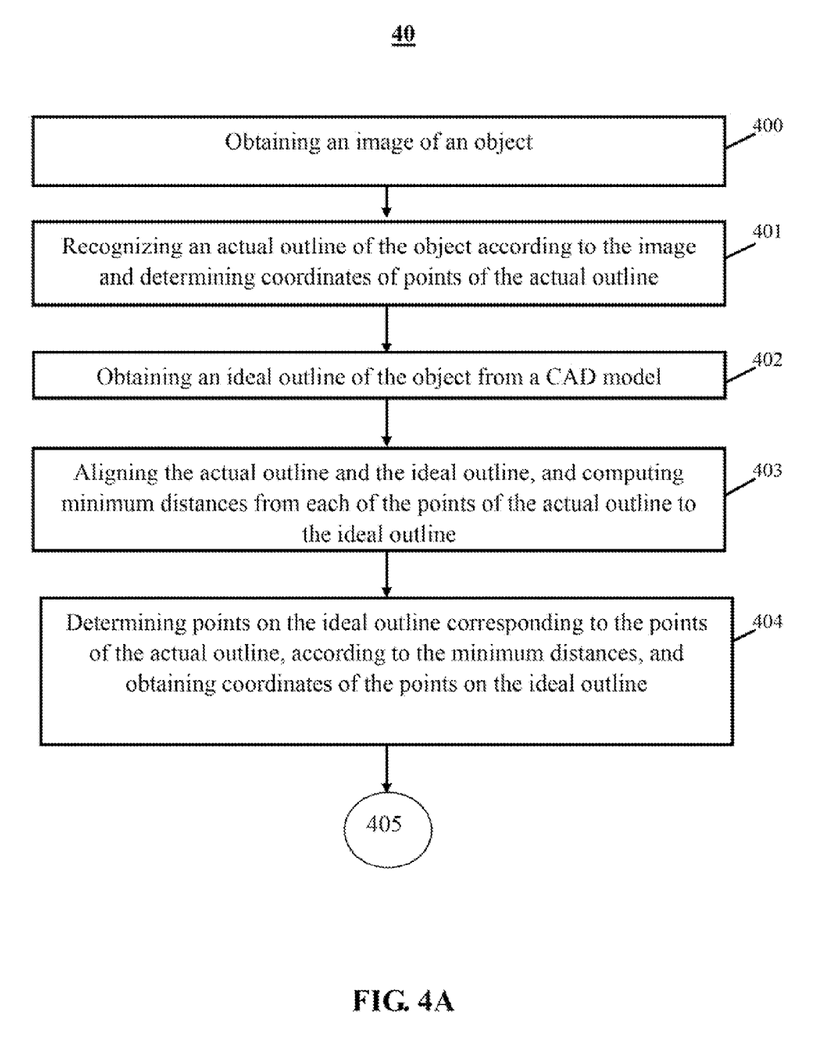
FIG. 4A and FIG. 4B illustrate a flowchart of one embodiment of an accuracy compensation method.
Figure 4B:
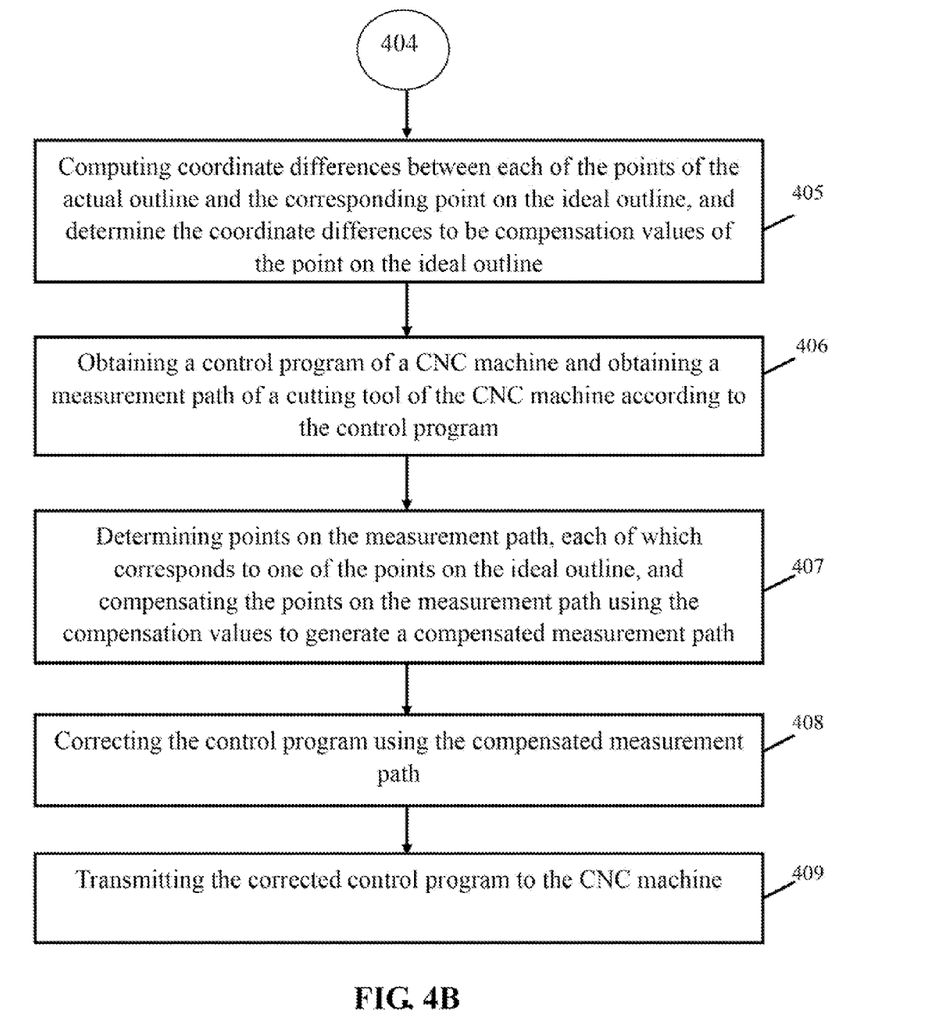

FIG. 4A and FIG. 4B illustrate a flowchart of one embodiment of an accuracy compensation method, namely accuracy compensation of a control program that can control a computer numerically controlled (CNC) machine to cut material away from a block of material, e.g., metal or plastic, to produce a desired product is achieved. In the embodiment, the accuracy compensation method can be executed by at least one processor of a computing device.

Referring to FIG. 4, a flowchart is presented in accordance with an example embodiment being illustrated. The example method 40 is provided by way of example, as there are a variety of ways to carry out the method. The method 40 described below can be carried out using the configurations illustrated in FIGS. 1 to 3, for example, and various elements of these figures are referenced in explaining example method 40. Each block shown in FIG. 4 represents one or more processes, methods, or subroutines carried out in the example method 40. Additionally, the illustrated order of blocks is by example only and the order of the blocks can change. The example method 40 can begin at block 400.

At block 400, the computing device obtains an image of a product. The product is produced by controlling a cutting tool of the CNC machine to move along three axes, including an X-axis, a Y-axis, and a Z-axis, to cut material away from a block of material (e.g., metal or plastic). In one embodiment, the computing device can send a predetermined command to an image capture device, control the image capture device to capture the image of the product according to the predetermined command, and obtain the image of the product from the image capture device. The image capture device can be a camera, a digital video camera, for example, and is connected to the computing device. In at least one embodiment, the image capture device can be a component, such as a charge-couple device (CCD) that can be integrated into the CNC machine or the computing device. In at least one embodiment, the computing device can obtain the image of the product from a storage unit of the computing device, or a database that is connected to the computing device via a network.

At block 401, the computing device recognizes an actual outline of the product according to the image of the product, and determines coordinates of points of the actual outline. In one embodiment, the actual outline is composed by points, as shown in FIG. 6. In one embodiment, the computing device converts the image of the product to a binary image by implementing an adaptive threshold segmentation of pixels of the image, and recognizes the actual outline of the product according to a pixel variation in the binary image. The adaptive threshold segmentation is implemented by using a threshold, such as 125, to segment the pixels of the image. When the pixel of the image is less than the threshold, the pixel is changed to a value 0 for example, and when the pixel of the image is more than or equal to the threshold, the pixel is changed to a value 1 for example. In one embodiment, the computing device computes coordinates of points of the actual outline using an X-axis grating scale, a Y-axis grating scale, and a Z-axis grating scale of the CNC machine.

At block 402, the computing device obtains an ideal outline of the product. In one embodiment, the ideal outline is composed by a line, as shown in FIG. 6, and is obtained from a CAD model of the product. The CAD model of the product can be pre-stored in the storage unit of the computing device. In other embodiment, the CAD model of the product can be obtained from a database through a network.

At block 403, the computing device aligns the actual outline and the ideal outline of the product, and computes minimum distances from each of the points of the actual outline to the ideal outline, such as shown in FIG. 7. In one embodiment, the computing device aligns the actual outline and the ideal outline of the product according to a formula:

$$f(X) = \text{Min} \sqrt{\frac{\sum_{n=1}^{n} \left(\sqrt{(X2-X1)^2 + (Y2-Y1)^2 + (Z2-Z1)^2}\right)^2}{n}}.$$

In the function, (X2, Y2, Z2) are coordinates of the points of the actual outline, and (X1, Y1, Z1) are coordinates of points on the ideal outline. As shown in FIG. 6, the actual outline and the ideal outline of the product are aligned, when a computed f(X) reaches minimum.

At block 404, the computing device determines points on the ideal outline, each of which corresponds to one of the points on the actual outline, according to the minimum distances, and obtains coordinates of the points on the ideal outline.

At block 405, the computing device computes coordinate differences between each of the points of the actual outline and the corresponding point on the ideal outline. For example, a point (X, Y, Z) of the actual outline has a minimum distance D to the ideal outline. According to the minimum distance D, the point on the ideal outline corresponding to the point (X, Y, Z) is a point (X', Y', Z'), then the coordinate difference is (X-X', Y-Y', Z-Z'). The coordinate differences are considered as compensation values of the points on the ideal outline.

At block 406, the computing device obtains the control program that controls the CNC machine to produce the product, and obtains a measurement path of the cutting tool of the CNC machine according to the control program.

At block 407, the computing device determines points on the measurement path corresponding to the points on the ideal outline, and generates a compensated measurement path by compensating the points on the measurement path using the compensation values.

At block 408, the computing device corrects the control program according to the compensated measurement path.

At block 408, the computing device transmits the corrected control program to another control device that is connected to the computing device or to the CNC machine.

Figure 5:
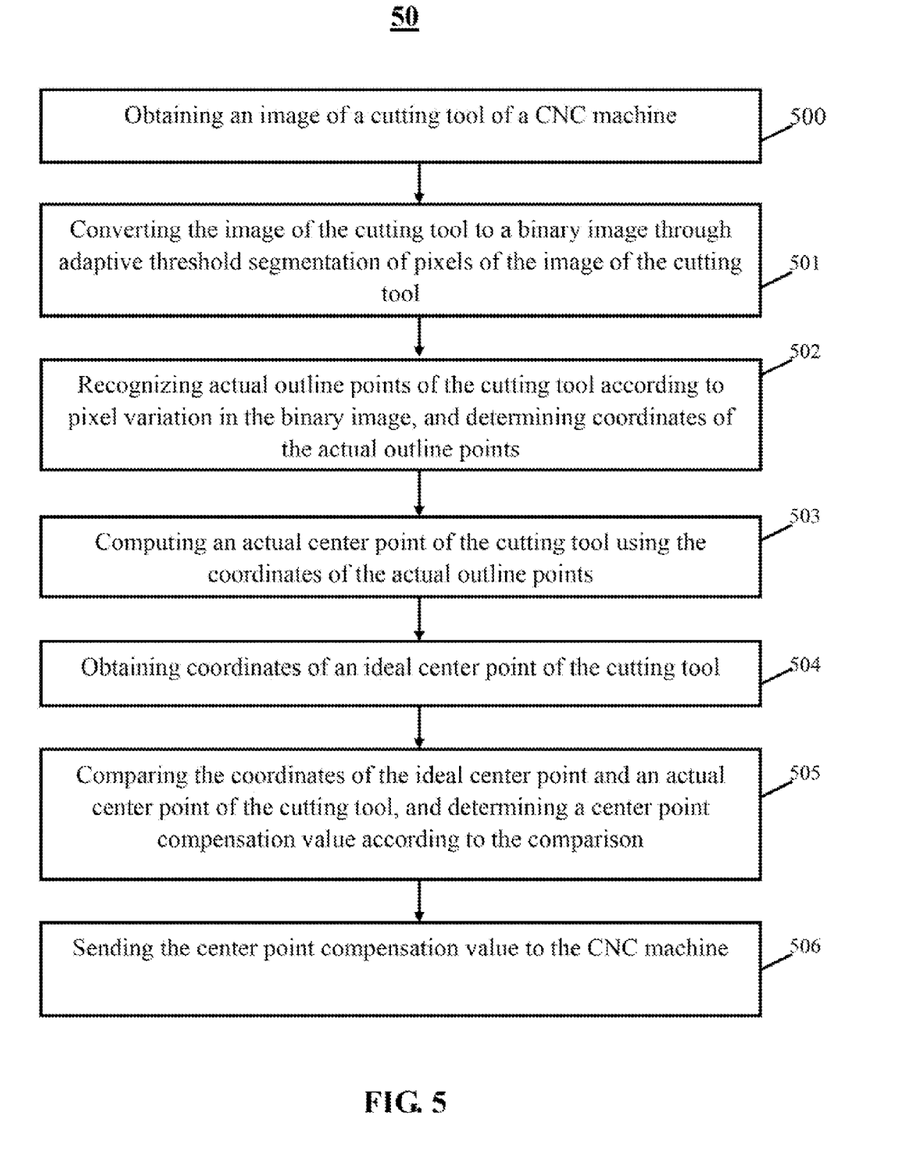
FIG. 5 is a flowchart of another embodiment of an accuracy compensation method.

FIG. 5 is a flowchart of another embodiment of an accuracy compensation method, namely accuracy compensation of a cutting tool of a computer numerically controlled (CNC) machine. In the embodiment, the accuracy compensation method can be executed by at least one processor of a computing device.

Referring to FIG. 5, a flowchart is presented in accordance with an example embodiment being illustrated. The example method 50 is provided by way of example, as there are a variety of ways to carry out the method. The method 50 described below can be carried out using the configurations illustrated in FIGS. 1 to 3, for example, and various elements of these figures are referenced in explaining example method 50. Each block shown in FIG. 5 represents one or more processes, methods, or subroutines carried out in the example method 50. Additionally, the illustrated order of blocks is by example only and the order of the blocks can change. The example method 40 can begin at block 500.

At block 500, the computing device obtains an image of the cutting tool of the CNC machine. In one embodiment, the computing device can send a predetermined command to an image capture device, control the image capture device to capture the image of the cutting tool according to the predetermined command, and obtain the image of the cutting tool from the image capture device. The image capture device can be a camera, a digital video camera, for example, and is connected to the computing device. In at least one embodiment, the image capture device can be a component, such as a charge-couple device (CCD) that can be integrated into the CNC machine or the computing device. In at least one embodiment, the computing device can obtain the image of the cutting tool from a storage unit of the computing device, or a database that is connected to the computing device via a network.

At block 501, the computing device converts the image of the cutting tool to a binary image through the adaptive threshold segmentation of pixels of the image of the cutting tool. As mentioned above, the adaptive threshold segmentation is implemented by using a threshold, such as 125, to segment the pixels of the binary image of the cutting tool. When a pixel of the binary image is less than the threshold, the pixel is changed to a value 0, for example, and when a pixel of the image is more than or equal to the threshold, the pixel is changed to a value 1, for example.

At block 502, the computing device recognizes actual outline points of the cutting tool according to a pixel variation in the binary image of the cutting tool, and determines coordinates of the actual outline points. In one embodiment, the computing device determines the coordinates of the actual outline points using an X-axis grating scale, a Y-axis grating scale, and a Z-axis grating scale of the CNC machine.

At block 503, the computing device computes an actual center point of the cutting tool using the coordinates of the actual outline points. In one embodiment, the coordinate (X, Y, Z) of the actual center point is computed according to formulas:

$$X = \frac{\sum_{i=1}^{n} X_i}{n}, Y = \frac{\sum_{i=1}^{n} Y_i}{n}, \text{ and } Z = \frac{\sum_{i=1}^{n} Z_i}{n}.$$

In the formulas, $(X_i, Y_i, Z_i)$ are coordinates of the actual outline points.

At block 504, the computing device obtains an ideal center point of the cutting tool. The ideal center point of the cutting tool can be obtained from a storage unit of the computing device or from a database which is connected to the computing device via a network. In at least one embodiment, the ideal center point of the cutting tool can be obtained according to coordinates of ideal outline points of the cutting tool according to the formulas above.

At block 505, the computing device compares the coordinates of the ideal center point and the actual center point of the cutting tool, and determine a center point compensation value according to the comparison. For example, when the coordinate of the actual center point of the cutting tool 20 is (X, Y, Z), and the coordinate of the ideal center point of the cutting tool 20 is point (X', Y', Z'), the center point compensation value is (X-X', Y-Y', Z-Z').

At block 506, the computing device sends the center point compensation value to the CNC machine. The CNC machine can adjust a position of the cutting tool according to the center point compensation value.

It may be understood that, the method described in FIG. 4 can compensate a control program that can control a computer numerically controlled (CNC) machine, and the method described in FIG. 5 can compensate a cutting tool of the CNC machine. In other embodiment, the present application may also include a method that can compensate both the control program and the cutting tool. It may be further understood that, the method described in FIG. 5 can compensate a center point of the cutting tool. In other embodiment, the present application also can compensate other attributes of the cutting tool, such as a center axis of the cutting tool, in the same way.

The embodiments shown and described above are only examples. Many details are often found in the art. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An accuracy compensation method executable by at least one processor of a computing device, the method comprising:

obtaining an image of a product from an image source, wherein the image source comprises an image capture device which communicates with the computing device wirelessly, a storage device in the computing device, and a database which is connected to the computing device via a network;

recognizing an actual outline of the product according to the image of the product, and determining coordinates of points of the actual outline;

obtaining an ideal outline of the product from a CAD model of the product;

aligning the actual outline and the ideal outline of the product, and computing minimum distances from each of the points of the actual outline to the ideal outline;

determining points on the ideal outline, each of which corresponds to one of the points on the actual outline, according to the minimum distances, and obtaining coordinates of the points on the ideal outline;

computing coordinate differences between each of the points of the actual outline and each of the corresponding points on the ideal outline;

assigning compensation values of the points on the ideal outline based on the coordinate differences;

obtaining a control program from a storage medium, wherein the storage medium comprises the storage device in the computing device and a storage device in a control device which is connected to the computing device, controlling a computer numerically controlled (CNC) machine to produce the product using the control program, and obtaining a measurement path of a cutting tool of the CNC machine according to the control program;

determining points on the measurement path corresponding to the points on the ideal outline;

generating a compensated measurement path by compensating the points on the measurement path using the compensation values; and correcting the control program according to the compensated measurement path.

2. The method according to claim 1, wherein the actual outline of the product is recognized by:

converting the image of the product to a binary image by implementing an adaptive threshold segmentation of pixels of the image; and determining the actual outline of the product according to a pixel variation in the binary image.

3. The method according to claim 1, wherein the coordinates of points of the actual outline are determined using an X-axis grating scale, a Y-axis grating scale, and a Z-axis grating scale of the CNC machine.

4. The method according to claim 1, wherein the actual outline and the ideal outline are aligned according to a formula of $$f(X) = \text{Min} \sqrt{\frac{\sum_{n=1}^{n} \left(\sqrt{(X2-X1)^2 + (Y2-Y1)^2 + (Z2-Z1)^2}\right)^2}{n}},$$

in the formula, (X2, Y2, Z2) being coordinates of the points of the actual outline, and (X1, Y1, Z1) being coordinates of points on the ideal outline, the actual outline and the ideal outline of the product being determined to be aligned when a minimum f(X) is computed.

5. The method according to claim 1, further comprising:

obtaining an image of the cutting tool of the CNC machine;

converting the image of the cutting tool to a binary image by implementing an adaptive threshold segmentation of pixels of the image of the cutting tool;

recognizing actual outline points of the cutting tool according to a pixel variation in the binary image of the cutting tool, and determining coordinates of the actual outline points;

computing an actual center point of the cutting tool using the coordinates of the actual outline points;

obtaining an ideal center point of the cutting tool;

comparing the coordinates of the ideal center point and the actual center point of the cutting tool, and determining a center point compensation value according to the comparison; and sending the center point compensation value to the CNC machine.

6. The method according to claim 5, wherein a coordinate (X, Y, Z) of the actual center point is determined according to formulas of $$X = \frac{\sum_{i=1}^{n} X_i}{n}, Y = \frac{\sum_{i=1}^{n} Y_i}{n}, \text{ and } Z = \frac{\sum_{i=1}^{n} Z_i}{n},$$

$(X_i, Y_i, Z_i)$ being coordinates of the actual outline points of the cutting tool.

7. The method according to claim 5, wherein a coordinate (X', Y', Z') of the ideal center point is obtained according to formulas of $$X' = \frac{\sum_{i=1}^{n} X'_i}{n}, Y' = \frac{\sum_{i=1}^{n} Y'_i}{n}, \text{ and } Z' = \frac{\sum_{i=1}^{n} Z'_i}{n},$$

$(X'_i, Y'_i, Z'_i)$ being coordinates of the ideal outline points of the cutting tool.

8. A computing device comprising:

a processor; and a storage device storing one or more programs which when executed by the control device, causes the control device to:

obtain an image of a product from an image source, wherein the image source comprises an image capture device which communicates with the computing device wirelessly, the storage device in the computing device, and a database which is connected to the computing device via a network;

recognize an actual outline of the product according to the image of the product, and determine coordinates of points of the actual outline;

obtain an ideal outline of the product from a CAD model of the product;

align the actual outline and the ideal outline of the product, and compute minimum distances from each of the points of the actual outline to the ideal outline;

determine points on the ideal outline, each of which corresponds to one of the points on the actual outline, according to the minimum distances, and obtain coordinates of the points on the ideal outline;
compute coordinate differences between each of the points of the actual outline and each of the corresponding points on the ideal outline;
assigning compensation values of the points on the ideal outline based on the coordinate differences;
obtain a control program from a storage medium, wherein the storage medium comprises the storage device in the computing device and a storage device in a control device which is connected to the computing device, control a computer numerically controlled (CNC) machine to produce the product using the control program, and obtain a measurement path of a cutting tool of the CNC machine according to the control program;
determine points on the measurement path corresponding to the points on the ideal outline;
generate a compensated measurement path by compensating the points on the measurement path using the compensation values; and
correct the control program according to the compensated measurement path.

9. The computing device according to claim 8, wherein the actual outline of the product is computed by:
converting the image of the product to a binary image by implementing an adaptive threshold segmentation of pixels of the image; and
determining the actual outline of the product according to a pixel variation in the binary image.

10. The computing device according to claim 8, wherein the coordinates of points of the actual outline are determined using an X-axis grating scale, a Y-axis grating scale, and a Z-axis grating scale of the CNC machine.

11. The computing device according to claim 8, wherein the actual outline and the ideal outline are aligned according to a formula of $$f(X) = \mathrm{Min} \sqrt{\frac{\sum_{n=1}^{n} \left(\sqrt{(X2-X1)^2 + (Y2-Y1)^2 + (Z2-Z1)^2}\right)^2}{n}},$$

in the formula, (X2,Y2, Z2) being coordinates of the points of the actual outline, and (X1, Y1, Z1) being coordinates of points on the ideal outline, the actual outline and the ideal outline of the product being determined to be aligned when a minimum f(X) is computed.

12. The computing device according to claim 8, wherein the one or more programs which when executed by the control device, further causes the control device to:
obtain an image of the cutting tool of the CNC machine;
convert the image of the cutting tool to a binary image by implementing an adaptive threshold segmentation of pixels of the image of the cutting tool;
recognize actual outline points of the cutting tool according to a pixel variation in the binary image of the cutting tool, and determine coordinates of the actual outline points;
compute an actual center point of the cutting tool using the coordinates of the actual outline points;
obtain an ideal center point of the cutting tool;
compare the coordinates of the ideal center point and the actual center point of the cutting tool, and determine a center point compensation value according to the comparison; and
send the center point compensation value to the CNC machine.

13. The computing device according to claim 12, wherein a coordinate (X, Y, Z) of the actual center point is determined according to formulas of $$X = \frac{\sum_{i=1}^{n} X_i}{n}, Y = \frac{\sum_{i=1}^{n} Y_i}{n}, \text{ and } Z = \frac{\sum_{i=1}^{n} Z_i}{n},$$

$(X_i, Y_i, Z_i)$ being coordinates of the actual outline points of the cutting tool.

14. The computing device according to claim 12, a coordinate (X', Y', Z') of the ideal center point is obtained according to formulas of $$X' = \frac{\sum_{i=1}^{n} X'_i}{n}, Y' = \frac{\sum_{i=1}^{n} Y'_i}{n}, \text{ and } Z' = \frac{\sum_{i=1}^{n} Z'_i}{n},$$

$(X'_i, Y'_i, Z'_i)$ being coordinates of the ideal outline points of the cutting tool.

15. A non-transitory storage medium having stored thereon instructions that, when executed by a processor of a computing device, causes the processor to perform an accuracy compensation method, the method comprising:
obtaining an image of a product from an image source, wherein the image source comprises an image capture device which communicates with the computing device wirelessly, a storage device in the computing device, and a database which is connected to the computing device via a network;
recognizing an actual outline of the product according to the image of the product, and determining coordinates of points of the actual outline;
obtaining an ideal outline of the product from a CAD model of the product;
aligning the actual outline and the ideal outline of the product, and computing minimum distances from each of the points of the actual outline to the ideal outline;
determining points on the ideal outline, each of which corresponds to one of the points on the actual outline, according to the minimum distances, and obtaining coordinates of the points on the ideal outline;
computing coordinate differences between each of the points of the actual outline and each of the corresponding points on the ideal outline;
assigning compensation values of the points on the ideal outline based on the coordinate differences;
obtaining a control program from a storage medium, wherein the storage medium comprises the storage device in the computing device and a storage device in a control device which is connected to the computing device, controlling a computer numerically controlled (CNC) machine to produce the product using the control program, and obtaining a measurement path of a cutting tool of the CNC machine according to the control program;
determining points on the measurement path corresponding to the points on the ideal outline;
generating a compensated measurement path by compensating the points on the measurement path using the compensation values; and correcting the control program according to the compensated measurement path.

16. The non-transitory storage medium according to claim 15, wherein the actual outline of the product is computed by:
converting the image of the product to a binary image by implementing an adaptive threshold segmentation of pixels of the image; and
determining the actual outline of the product according to a pixel variation in the binary image.

17. The non-transitory storage medium according to claim 15, wherein the coordinates of points of the actual outline are determined using an X-axis grating scale, a Y-axis grating scale, and a Z-axis grating scale of the CNC machine.

18. The non-transitory storage medium according to claim 15, wherein the actual outline and the ideal outline are aligned according to a formula of $$f(X) = \text{Min} \sqrt{\frac{\sum_{n=1}^{n} \left(\sqrt{(X2-X1)^2 + (Y2-Y1)^2 + (Z2-Z1)^2}\right)^2}{n}},$$

in the formula, (X2, Y2, Z2) being coordinates of the points of the actual outline, and (X1, Y1, Z1) being coordinates of points on the ideal outline, the actual outline and the ideal outline of the product being determined to be aligned when a minimum f(X) is computed.

19. The non-transitory storage medium according to claim 15, wherein the method further comprises:
obtaining an image of the cutting tool of the CNC machine;
converting the image of the cutting tool to a binary image by implementing an adaptive threshold segmentation of pixels of the image of the cutting tool;
recognizing actual outline points of the cutting tool according to a pixel variation in the binary image of the cutting tool, and determining coordinates of the actual outline points;
computing an actual center point of the cutting tool using the coordinates of the actual outline points;
obtaining an ideal center point of the cutting tool;
comparing the coordinates of the ideal center point and the actual center point of the cutting tool, and determining a center point compensation value according to the comparison; and
sending the center point compensation value to the CNC machine.

20. The non-transitory storage medium according to claim 19, wherein a coordinate of the actual center point and a coordinate of the ideal center point is computed using formulas of $$X = \frac{\sum_{i=1}^{n} X_i}{n}, Y = \frac{\sum_{i=1}^{n} Y_i}{n}, \text{ and } Z = \frac{\sum_{i=1}^{n} Z_i}{n},$$

$(X_i, Y_i, Z_i)$ being coordinates of the actual outline points or coordinates of the ideal outline points.

* * * * *